(12) United States Patent
De Coninck et al.

(10) Patent No.: US 8,663,353 B2
(45) Date of Patent: Mar. 4, 2014

(54) SELECTIVE GAS FILTER

(75) Inventors: Pierre De Coninck, Saint Alexandre (FR); Christophe Brenneis, Saint Victor la Coste (FR); Guillaume Ranc, Rochefort du Gard (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 13/635,705

(22) PCT Filed: Mar. 17, 2011

(86) PCT No.: PCT/EP2011/054064
§ 371 (c)(1),
(2), (4) Date: Oct. 18, 2012

(87) PCT Pub. No.: WO2011/113901
PCT Pub. Date: Sep. 22, 2011

(65) Prior Publication Data
US 2013/0025244 A1    Jan. 31, 2013

(30) Foreign Application Priority Data
Mar. 19, 2010 (FR) ...................................... 10 52004

(51) Int. Cl.
*B01D 45/08* (2006.01)

(52) U.S. Cl.
USPC ................... 55/462; 55/482; 55/485; 55/342; 55/350.1; 55/443; 55/444; 95/273; 95/287

(58) Field of Classification Search
USPC ........ 55/462, 482, 485, 342, 350.1, 443, 444; 95/273, 287
See application file for complete search history.

(56) References Cited

U.S. PATENT DOCUMENTS

| 3,944,646 A |   | 3/1976  | Martin         |         |
|-------------|---|---------|----------------|---------|
| 4,551,157 A |   | 11/1985 | Becker et al.  |         |
| 5,050,508 A | * | 9/1991  | Wilson         | 110/235 |

FOREIGN PATENT DOCUMENTS

| DE | 196 50 266 | 6/1998 |
|----|------------|--------|
| EP | 0 089 479  | 9/1983 |

OTHER PUBLICATIONS

International Search Report Issued Jun. 15, 2011 in PCT/EP11/54064 Filed Mar. 17, 2011.

* cited by examiner

*Primary Examiner* — Dung H Bui
(74) *Attorney, Agent, or Firm* — Oblon, Spivak, McClelland, Maier & Neustadt, L.L.P.

(57) ABSTRACT

A filter including multiple tanks connected in series by connecting ducts. In the filter a flow of gaseous flows encounters multiple obstacles in it, an effect of which is efficiently to block constituents with heaviest molecular weight, without substantially hindering diffusion of lighter constituents. This may be obtained by internal baffles, or by a bank of finer ducts, for example at an inlet of the filter. Such a filter may find application to separation of hydrogen and radon produced by nuclear waste.

9 Claims, 1 Drawing Sheet

SELECTIVE GAS FILTER

Figure 1:
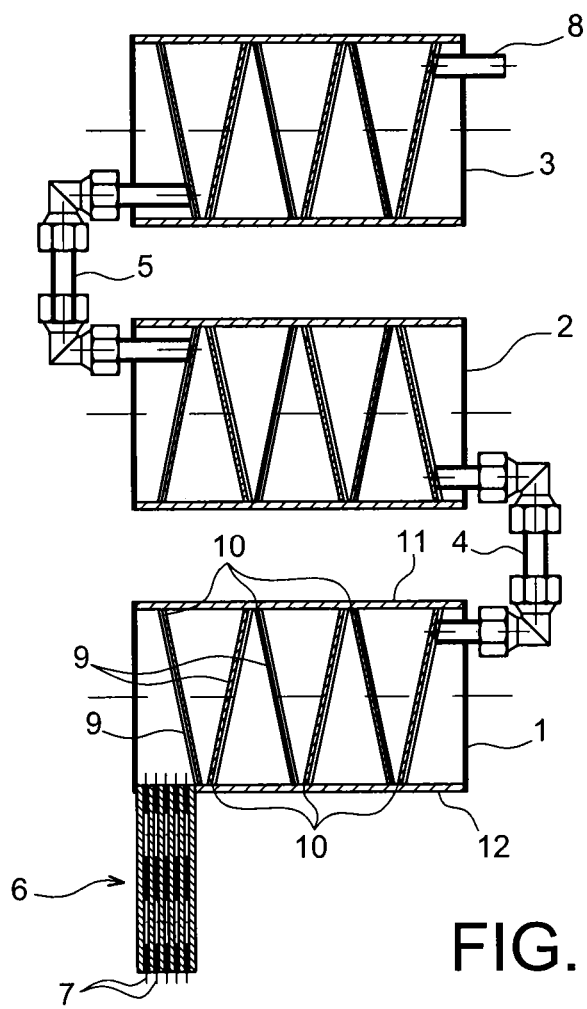

The invention concerns a selective gas filter, notably designed to separate gases of very different molecular weights in a low-speed current. It also concerns an application of this filter to confinement of radon by separating it from a lighter gas such as hydrogen, evacuation of which is, conversely, sought.

Habitual filters often rely on the use of porous media (made of ceramic material or metal, or liquids, etc.) of bodies such as activated carbons which attach certain components of the flow traversing them. They have the disadvantage that they regularly require maintenance as they become clogged or saturated. They are normally not suitable as selective filters of gaseous blends since they have no real power of discrimination of their constituents, and they generally require the application of substantially high pressure to force the flow through them.

The field from which the invention originates is filtration of gaseous blends from drums of nuclear waste, which produce hydrogen and radon, the latter being radioactive and therefore dangerous; but its short half-life (a period of approximately 4 days) means that there is no requirement for it to be attached definitively, but only that it should be kept in the filter for a limited period until it disappears. Complete evacuation of the hydrogen to the exterior, where it is dispersed, is on the contrary sought due to its flammable character.

A filter able to retain radon over the desired period, whilst allowing hydrogen to pass rapidly through it, preventing it from accumulating, even where there is no notable high pressure on the side of the filter where the gaseous blend is produced, has therefore been developed. Attempts to improve traditional filters by modifying their parameters and those of their pores have given no results for the selectivity of filtration of gaseous blends, since such modifications have no opposing effects on the different constituents of the blends, although the overall retention characteristics can be substantially modified. The invention concerns, on the contrary, a filter having very satisfactory selectivity, able to retain approximately 100% of the radon and only 2% of hydrogen when it is traversed at low speed and at a low flow rate by a gaseous blend containing these constituents, due to a particular shape.

Document EP-A-9 089 479 describes a gas filter which is in fact a gas separator, in light of their atomic weights. Separation is accomplished by deflectors into which the gases are projected at high speed, and which only the light components can follow, the heavy components being, conversely, driven due to their inertia towards other filter outlet branches. A pump is required to impart the required speed to the blend. The invention is used, on the contrary, under almost-static conditions for weak flows of gaseous blends, and operates without separating their contents, or using inertial forces of the current, but by slowing down the progress of the heavy components using obstacles, and by exploiting the inertia of some of these components such that they never exit the filter. Document DE-A-196 50 266 describes a radon filter where a tank contains plates arranged as a baffle, which stops the radon, but which are in reality particle-absorption plates, on to which the radon is presumed to be attached. It does not therefore teach the separation of two free gases in a blend.

In its more general form, the filter of the invention is characterised in that it includes multiple tanks arranged in series, interconnected by means of ducts. Indeed, it has been observed that large ratios of section between the tanks and the intermediate pipes enable the former to slow sufficiently the heavy constituents of the blends, whereas the light constituents had no difficulty in following the filter's section variations, in circumventing the obstacles and in traversing it completely.

Selectivity (understood here to be the property of hindering to a much higher extent the flow of a heavy constituent of the blend) depends greatly on the characteristics of the filter, notably its shape and the dimensions of the tanks and ducts, and on their numbers. It can also be improved greatly by certain improvements. The tanks can thus be occupied by successive baffles imposing a winding path; the baffles are advantageously walls occupying successive sections of the tanks between an inlet aperture and an outlet aperture, except for slits arranged alternately on two opposing lateral sides of the tanks, and the walls are inclined towards the inlet aperture in the direction of the slits. According to another type of improvement, the filter includes an inlet in a first of the tanks consisting of a bank of ducts, each of which is at least thirty times longer than its internal diameter; whereas the ducts connecting the tanks to one another are advantageously single tubes having an internal diameter at least ten times greater than that of the ducts of the bank. Finally, it is advantageous for each of the tanks to have an inlet duct and an outlet duct opening on to portions of inlet and outlet walls of the tank facing one another, relative to a median line of the tank extending from one to the other of the said walls.

The general effect of all these measures is to establish additional obstacles for the flow of the gaseous flows, and they thus have the property of hindering to a greater degree the flow of the heaviest constituent without exerting a substantial effect on the light constituent, which is diffused almost freely through the filter, whereas the heavy constituent becomes almost stagnant.

Two embodiments of the invention will now be described in full by means of FIGS. 1 and 2. These embodiments are not restrictive embodiments of the invention, and are used only to illustrate its most important aspects.

FIG. 1 represents a first embodiment. It includes three cylindrical or parallelepipedic tanks 1, 2 and 3 connected to one another in series by ducts 4 and 5, and also including a bank 6 of inlet ducts 7 which are finer than the previous ones, and an outlet duct 8. All these elements are positioned in succession such that a gaseous stream flowing through the filter traverses firstly ducts 7 of bank 6, then tank 1, duct 4, tank 2, duct 5, tank 3 and outlet duct 8. Since no separation of the gases is accomplished by a forking of the flow, there is a single outlet duct 8 and the inside of the filter forms a single flow path. The ducts generally emerge in tanks 1, 2 and 3 through extreme and opposing faces (or close to these faces, which is true in the case of bank 6), such that the gaseous flows traverse the full lengths of them. In addition, the inlet and outlet apertures of the ducts in each of tanks 1, 2 and 3 are shifted or staggered, i.e. they emerge in portions of this wall which are facing one another, relative to lengthways median axes of the tanks (shown with dotted lines in the figure). It has been observed that this arrangement substantially improved the selectivity of each of the tanks, by making blocking of the heaviest constituent much easier.

The diameters of ducts 7 of bank 6 are of the order of one millimeter, and are approximately one decimeter in length. Their function is also to assist selectivity; however, they have the disadvantage that they also block to some degree the light constituents of the blend, and for this reason they are not widely used in the filter, and the other ducts, connecting the tanks and the outlet duct, are single tubes the diameter of which is large compared to that of ducts 7, of the order of ten times greater, or more. Bank 6 can also be omitted in many cases with acceptable results, but optimum results have often been obtained by using it quite sparingly, and for this reason it is proposed only at the inlet of the filter in this embodiment.

The number of tanks could be modified. It became clear that having multiple tanks was probably essential to obtain satisfactory results. Satisfactory selectivity is often obtained with three tanks. A higher number of tanks could improve the selectivity further, but the filter would then be more complicated. Their volume can be of several liters.

An important measure concerns baffles 9 inside tanks 2 and 3. These are plates which obstruct successive sections of them, except for slits 10 on one edge. Slits 10 are arranged alternately on sides 11 and 12 opposite the side wall of each of tanks 1, 2 and 3. Finally, baffles 9 are inclined towards the tanks' inlet apertures, in the direction of the slits. It was observed that these baffles 9 formed pockets greatly improving stagnation of the heaviest constituents of the gaseous blend, almost without hindering the diffusion of the lightest constituents. Stagnation is improved when the flow rate of the flow is low, establishing almost-static conditions (i.e. ones in which the flow speed is too small to have a real effect based, for example, on the inertial forces). A few baffles 9 can be sufficient in each of tanks 1, 2 and 3. Selectivity is generally correlated to the variations of flow characteristics inside the filter in the traversal direction and section, i.e. the winding nature of the flow: it increases with the number of tanks, the length and fineness of the intermediate pipes and the presence of banks corresponding to divisions of these ducts, but the baffles are the most effective means of establishing it. The best selectivity will often be obtained with a filter which is quite permeable overall, having a moderate number of tanks and rather wide pipes, but with a tank which has quite a large number of baffles 9. If they are present in large numbers, for example several tens in each tank, notable improvement of selectivity is no longer obtained, however.

The material of the constituents of the filter is not critical, since no effect other than the modification of the flow characteristics is sought.

Figure 2:
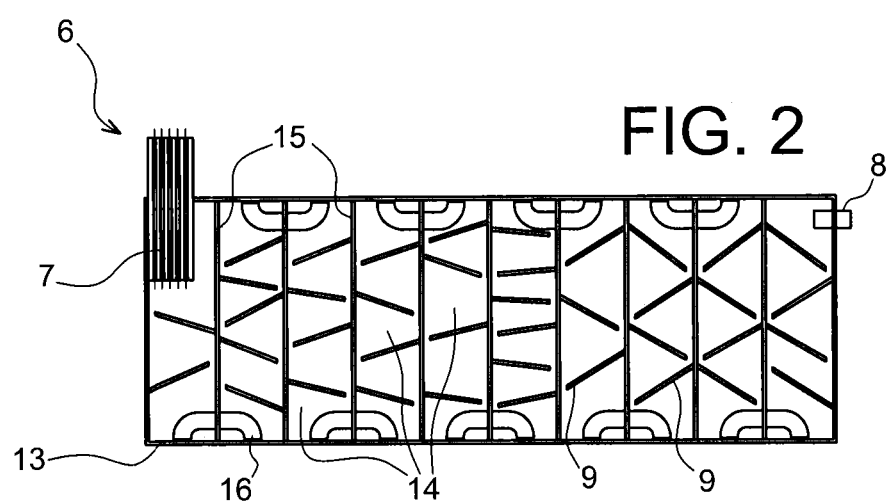

Another embodiment is represented in FIG. 2. In this case it includes a single box-shaped casing 13, and tanks 14 are compartments which are bracketed to one another, parallel and separated by partitions 15 to which baffles 9 are connected, which are unchanged relative to the previous embodiment, except that their numbers, their inclinations and their distributions in this case differ from one tank 14 to another, without this altering the operation of the filter. Bank 6 of ducts 7 are found at the inlet. Ducts 4 and 5 connecting the tanks are in this case replaced by internal ducts 16 which are bent through 180° as they traverse partitions 15, supported by them in their centres, and the ends of which open into two adjacent tanks 14. Since these ends are pointing towards the closest wall of casing 13, to which they are adjacent, with clearance, the gaseous flow changes its flow direction when it passes from a tank 14 to a duct 16, and vice versa, making its path even more winding, and thus also improving selectivity. This embodiment includes ten tanks 14. Outlet duct 8 is unchanged.

The invention claimed is:

1. A selective gas filter in which a flow of a heavy constituent in a blend of gases is hindered more than that of a light constituent, so as to slow and retain the heavy constituent to a greater degree, the filter comprising:
   multiple tanks arranged in series, and connected to one another by ducts;
   a single outlet duct for the gases;
   an interior of the filter forms a single internal path for the flow, thus there is no separation of the gases by a flow fork, and the tanks are occupied by successive baffles imposing a winding path.

2. A selective gas filter according to claim 1, wherein the baffles form pockets of stagnation of the heavy constituent of the flow.

3. A selective gas filter according to claim 1, further comprising an inlet in a first of the tanks including a bank of ducts, each of which is at least thirty times longer than an internal diameter.

4. A selective gas filter according to claim 1, wherein each of the tanks includes an inlet duct and an outlet duct opening onto portions of inlet and outlet walls of the tank facing one another, relative to a median line of the tank extending from one to an other of walls.

5. A selective gas filter according to claim 1, wherein the baffles are walls occupying successive sections of the tanks between an inlet aperture and an outlet aperture, except for slits positioned alternately on two facing lateral sides of the tanks, and the walls are inclined towards the inlet aperture and the slits.

6. A selective filter according to claim 3, wherein the ducts connecting the tanks to one another are single tubes having an internal diameter at least ten times greater than that of the ducts of the bank.

7. A selective filter according to claim 1, wherein the tanks are compartments bracketed to one another in a casing, separated by partitions.

8. A selective filter according to claim 7, wherein the ducts connecting the tanks to one another traverse the partitions through a central portion, are bent through 180°, and have ends directed towards walls of the casing and adjacent, with clearances, to these walls.

9. The selection filter according to claim 1, applied for separating radon, which is the heavy constituent, from another gas, which is the light constituent.

* * * * *

UNITED STATES PATENT AND TRADEMARK OFFICE
CERTIFICATE OF CORRECTION

PATENT NO. : 8,663,353 B2  
APPLICATION NO. : 13/635705  
DATED : March 4, 2014  
INVENTOR(S) : Pierre De Coninck et al.

Page 1 of 1

It is certified that error appears in the above-identified patent and that said Letters Patent is hereby corrected as shown below:

On the title page, Item (73) should read:

--(73) Assignee: Commissariat a l'Energie Atomique et aux energies alternatives, Paris (FR)--

Signed and Sealed this  
Twentieth Day of May, 2014

Michelle K. Lee  
*Deputy Director of the United States Patent and Trademark Office*